US011416656B1

(12) United States Patent
Einarsson et al.

(10) Patent No.: US 11,416,656 B1
(45) Date of Patent: Aug. 16, 2022

(54) OPTIMIZATION OF PHYSICAL DEVICES BY TRANSITIONING BETWEEN FABRICABLE AND UNFABRICABLE DESIGNS

(71) Applicant: X Development LLC, Mountain View, CA (US)

(72) Inventors: Carl Jonas Love Einarsson, Palo Alto, CA (US); Albin Lee Jones, Half Moon Bay, CA (US)

(73) Assignee: X Development LLC, Mountain View, CA (US)

( * ) Notice: Subject to any disclaimer, the term of this patent is extended or adjusted under 35 U.S.C. 154(b) by 183 days.

(21) Appl. No.: 16/804,753

(22) Filed: Feb. 28, 2020

(51) Int. Cl.
*G06F 30/20* (2020.01)
*G06F 119/18* (2020.01)

(52) U.S. Cl.
CPC .......... *G06F 30/20* (2020.01); *G06F 2119/18* (2020.01)

(58) Field of Classification Search
CPC ......... G05B 19/00; G06F 9/451; G06F 30/20; G06F 2119/18; G06F 30/37
USPC .......................................................... 703/1, 2
See application file for complete search history.

(56) References Cited

U.S. PATENT DOCUMENTS 6,744,729 B2 * 6/2004 Tinsley .................. G06F 9/451 370/229
7,523,429 B2 4/2009 Kroyan et al.
7,856,612 B1 12/2010 Ungar et al.
7,886,262 B2 2/2011 Chew et al.
10,042,973 B2 * 8/2018 Graur .................... G06F 30/398
10,296,681 B2 * 5/2019 Chen ....................... G03F 7/705
2002/0100918 A1 * 8/2002 Hsu ........................ G11C 5/142 257/200
2005/0108666 A1 * 5/2005 Chang .................. G06F 30/367 716/102
2006/0064661 A1 * 3/2006 Gray ...................... G06F 30/39 716/122
2006/0242618 A1 10/2006 Wang et al.
2017/0204541 A1 * 7/2017 Grossman .............. G05B 19/00
2020/0380080 A1 * 12/2020 Glunz .............. G05B 19/41865
2021/0271782 A1 * 9/2021 Jones ..................... G06F 30/10

OTHER PUBLICATIONS

Choy et al., "A Robust Computational algorithm for inverse photomask synthesis in optical projection lithography", SIAM Journal on Imaging Sciences, 2012, v. 5 n. 2, pp. 625-651.

(Continued)

*Primary Examiner* — Thai Q Phan
(74) *Attorney, Agent, or Firm* — Christensen O'Connor Johnson Kindness PLLC

(57) ABSTRACT

A non-transitory computer-readable storage medium having instructions stored thereon that, in response to execution by one or more processors of a computing system, cause the computing system to perform actions. The actions include receiving a pool of known fabricable designs for a physical device, generating proposed fabricable designs capable of being fabricated by a fabrication system based on pre-determined design rules, obtaining metadata characterizing the proposed fabricable designs, and updating the pool of the known fabricable designs by adding one or more of the proposed fabricable designs to the pool based, at least in part, on the metadata.

20 Claims, 8 Drawing Sheets

200

205 START OPTIMIZATION PROCESS TO GENERATE TARGET FABRICABLE DESIGN OF PHYSICAL DEVICE

210 RECEIVE POOL OF KNOWN FABRICABLE DESIGNS FOR THE PHYSICAL DEVICE CAPABLE OF BEING FABRICATED BY A FABRICATION SYSTEM BASED ON PRE-DETERMINED DESIGN RULES

215 GENERATE PROPOSED FABRICABLE DESIGNS CAPABLE OF BEING FABRICATED BY THE FABRICATION SYSTEM BASED ON THE PRE-DETERMINED DESIGN RULES

220 OBTAIN METADATA CHARACTERIZING THE PROPOSED FABRICABLE DESIGNS

225 UPDATE THE POOL OF THE KNOWN FABRICABLE DESIGNS BY ADDING ONE OR MORE OF THE PROPOSED FABRICABLE DESIGNS TO THE POOL BASED, AT LEAST IN PART, ON THE METADATA

230 CONSTRAINT MET? N Y

235 END OPTIMIZATION PROCESS

215

240 POOL OF KNOWN FABRICABLE DESIGNS FOR PHYSICAL DEVICE

260

245 SELECT AT LEAST ONE OF THE KNOWN FABRICABLE DESIGNS FROM THE POOL

250 PERTURB THE AT LEAST ONE OF THE KNOWN FABRICABLE DESIGNS SELECTED TO GENERATE UNFABRICABLE DESIGN THAT VIOLATES THE PRE-DETERMINED DESIGN RULES

255 TRANSFORM THE UNFABRICABLE DESIGN TO PROPOSED FABRICABLE DESIGNS BY MODIFYING THE UNFABRICABLE DESIGNS TO BE COMPLIANT WITH THE PRE-DETERMINED DESIGN RULES

265 PROPOSED FABRICABLE DESIGNS

(56) References Cited

OTHER PUBLICATIONS

Melati et al., "Mapping the global design space of nanophotonic components using machine learning pattern recognition", Nature Communications https://doi.org.10.1038/s41467-019-12698-1.
Su et al., "Nanophotonic Inverse Design with SPINS: Software Architecture and Practical Considerations", arXiv:1910.04829v2, physics.app-ph, Oct. 31, 2019.
Vercruysse et al., "Analytical level set fabrication constraints for inverse design", Scientific Reports, www.nature.com/scientificreports, Jun. 21, 2019.
Zhou et al., "Topology optimization for optical projection lithography with manufacturing uncertainties", Applied Optics, Apr. 2014.

* cited by examiner

215

220

310

| 1 | 1 | 1 | 1 | 1 | 1 |
|---|---|---|---|---|---|
| 1 | 1 | 0 | 0 | 1 | 1 |
| 1 | 1 | 1 | 1 | 1 | 1 |

320

| 1 | 0 | 0 | 1 | 0 | 0 |
|---|---|---|---|---|---|
| 1 | 0 | 1 | 1 | 0 | 0 |
| 1 | 1 | 1 | 1 | 0 | 1 |

330

| 1 | 1 | 0 | 0 | 1 | 1 |
|---|---|---|---|---|---|
| 0 | 0 | 1 | 1 | 0 | 0 |
| 1 | 1 | 0 | 1 | 0 | 1 |

FIG. 3A 342 340 344

| 1 | 1 | 1 | 1 | 0 | 0 |
|---|---|---|---|---|---|
| 1 | 1 | 0 | 1 | 0 | 0 |
| 1 | 1 | 1 | 1 | 0 | 1 |

FIG. 3B 358 356 350 352

| 0.9 | 1 | 0.1 | 0 | 1 | 0 |
|---|---|---|---|---|---|
| 0 | 0 | 1 | 1 | 0 | 0 |
| 1 | 0 | 0 | 1 | 0 | 1 |

| 1 | 0.5 | 0.5 | 1 | 0.5 | 0.5 |
|---|---|---|---|---|---|
| 1 | 0.5 | 0.5 | 0.5 | 0.5 | 0.5 |
| 1 | 1 | 1 | 1 | 0.5 | 1 |

| 1 | 1 | 0 | 1 | 1 | 1 |
|---|---|---|---|---|---|
| 1 | 0 | 1 | 1 | 0 | 0 |
| 1 | 1 | 1 | 1 | 0 | 1 |

| | | | | | |
|---|---|---|---|---|---|
| 1 | 1 | 1 | 1 | 1 | 1 |
| 0 | 0 | 0 | 0 | 1 | 1 |
| 1 | 1 | 1 | 1 | 0 | 0 |
| 1 | 1 | 0 | 0 | 0 | 1 |

435

| | | | | | |
|---|---|---|---|---|---|
| 1 | 1 | 1 | 1 | 1 | 1 |
| 0 | 0 | 1 | 1 | 1 | 1 |
| 0 | 0 | 1 | 1 | 0 | 0 |
| 1 | 1 | 0 | 0 | 0 | 0 |

445

| | | | | | |
|---|---|---|---|---|---|
| 1 | 1 | 1 | 1 | 1 | 1 |
| 1 | 1 | 0 | 0 | 1 | 1 |
| 1 | 1 | 0 | 0 | 0 | 0 |
| 1 | 1 | 0 | 0 | 0 | 0 |

OPTIMIZATION OF PHYSICAL DEVICES BY TRANSITIONING BETWEEN FABRICABLE AND UNFABRICABLE DESIGNS

TECHNICAL FIELD

This disclosure relates generally to design tools, and in particular but not exclusively, relates to design tools for optical and electromagnetic devices.

BACKGROUND INFORMATION

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes realized through a simple guess and check method in which a small number of design parameters are adjusted for suitability to a particular application. However, in actuality, the number of design parameters may extend into many billions or more, dependent on device size, device functionality, and manufacturing capabilities. As functionality of these optical and electromagnetic devices is increased and manufacturing improves to allow for smaller device feature sizes, it becomes increasingly important to take full advantage of these improvements via optimized device design.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 3A-3E are schematic drawings that illustrate non-limiting examples for perturbing fabricable designs to generate unfabricable designs that violate pre-determined design rules of a fabrication system, in accordance with embodiments of the present disclosure.

DETAILED DESCRIPTION

Figure 1A:
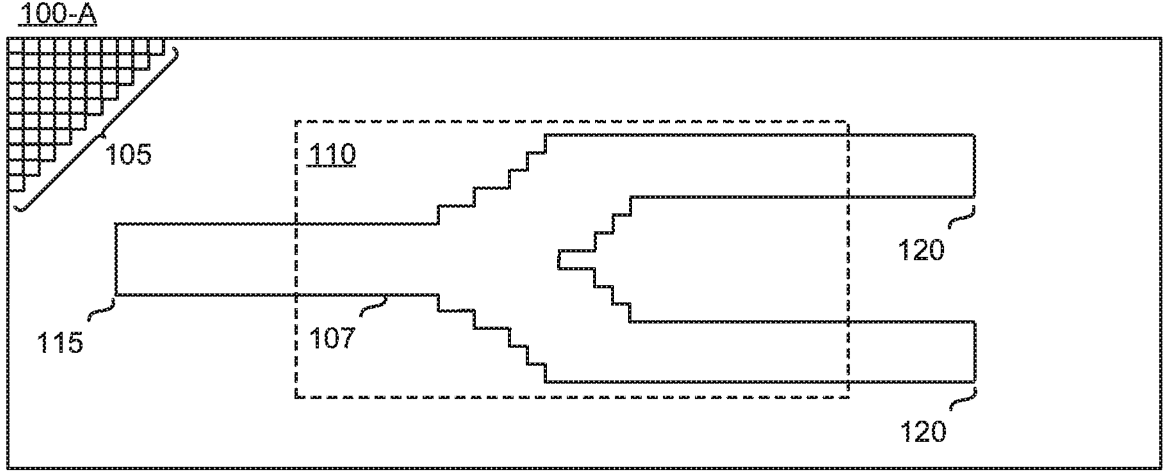
FIG. 1A illustrates an example rendering of a simulated environment describing a physical device, in accordance with an embodiment of the present disclosure.

Embodiments of a system, apparatus, and method for optimization of physical devices by transitioning between fabricable and unfabricable designs are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Inverse design techniques allow for a results-based approach to physical device design, in which target parameters are provided (e.g., size, performance, yield, etc. of a physical device such as an optical or electromagnetic device) and a system subsequently outputs a design that meets the target parameters. For example, a physical device may be described as a segmented design using pixels (e.g., a two-dimensional device) or voxels (e.g., a three-dimensional device), each segment locally describing one or more structural parameters (e.g., material type, refractive index, relative permittivity, or any other relevant physical characteristic) of the physical device at a respective position or location. Thus, inverse design techniques are not restricted to the limited number of design permutations available in conventional techniques, in which pre-determined building blocks (e.g., regions of fixed designs) are coupled together to achieve a desired functionality or performance. Rather, the number of available design permutations of a segmented design may be dependent on the relative size of the individual segments and the number of structural parameters associated with each segment. For example, a 1 $\mu m^2$ two-dimensional device having 10 $nm^2$ segments that are each limited to one of two different materials (e.g., silicon and silicon dioxide) results in a design space with $2^{100*100}$ different design permutations. Moreover, within that design space there may be multiple designs that meet target parameters, but only a fraction of which may be considered fabricable. Efficiently traversing through a design space with such a large number of design permutations to find individual designs that meet the target parameters is particularly challenging.

Described herein are embodiments of a system, apparatus, and method for optimization of physical devices by transitioning between fabricable and unfabricable designs, which are particularly well suited for navigating within a design space containing a large number of design permutations that could otherwise be considered intractable.

Figure 1B:
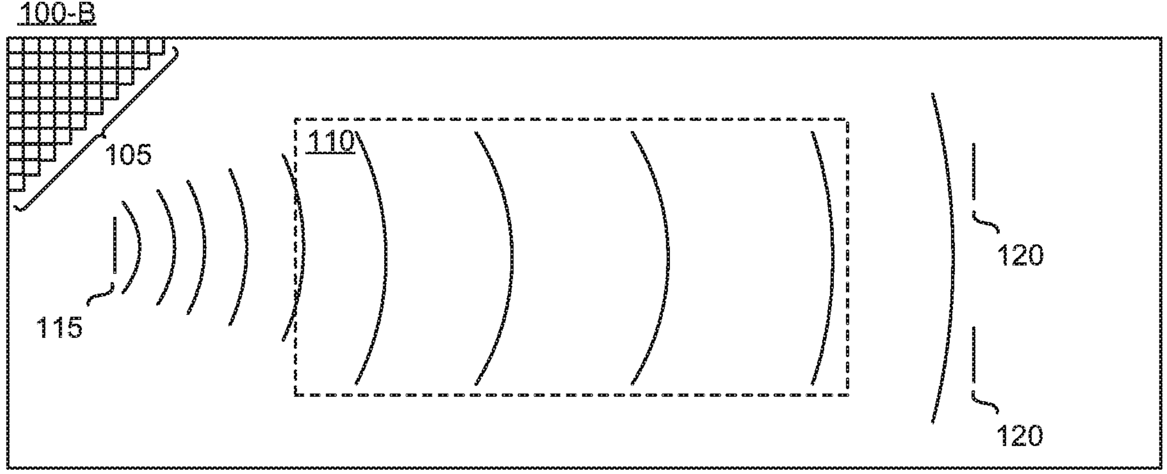
FIG. 1B illustrates an example operational simulation of the physical device, in accordance with an embodiment of the present disclosure.

FIG. 1A and FIG. 1B describe an example rendering of a simulated environment 100 describing a physical device and a corresponding operational simulation of the physical device according to various aspects of the present disclosure.

In the following embodiments, optimization of the physical device will be described in the context of an optical waveguide. However, it is appreciated that the physical device is not limited to optical waveguides, and that other physical devices such as lasers, lenses, transistors, optical devices, quantum-dynamic devices, antennas, optoelectronic switches, mechanical structures, and the like may be represented by the term "physical device."

In some embodiments, the physical device may be represented by a segmented design that is defined by a configuration of a plurality of segments. In some embodiments, the segmented design may be a two-dimensional design, wherein the segments are squares arranged in a two-dimensional grid pattern. In some embodiments, the segmented design may be a three-dimensional design, wherein the segments are cubes arranged in a three-dimensional grid pattern. These embodiments are non-limiting examples only, and in other embodiments, the segments may be any other shape and/or may be laid out in any other pattern. In some embodiments, the segments of a given segmented design may be of heterogeneous shapes and/or sizes. In the discussion herein, "segments" may also be referred to as "pixels" or "voxels" for two-dimensional segments and three-dimensional segments, respectively. It is further appreciated that in some embodiments, two-dimensional segmented designs may be representative of three-dimensional physical devices in which a given axis of the physical device is substantially uniform (e.g., a three-dimensional device having a substantially uniform z-axis may be described by a two-dimensional design representative of the x-y plane of the three-dimensional device).

Figure 5:
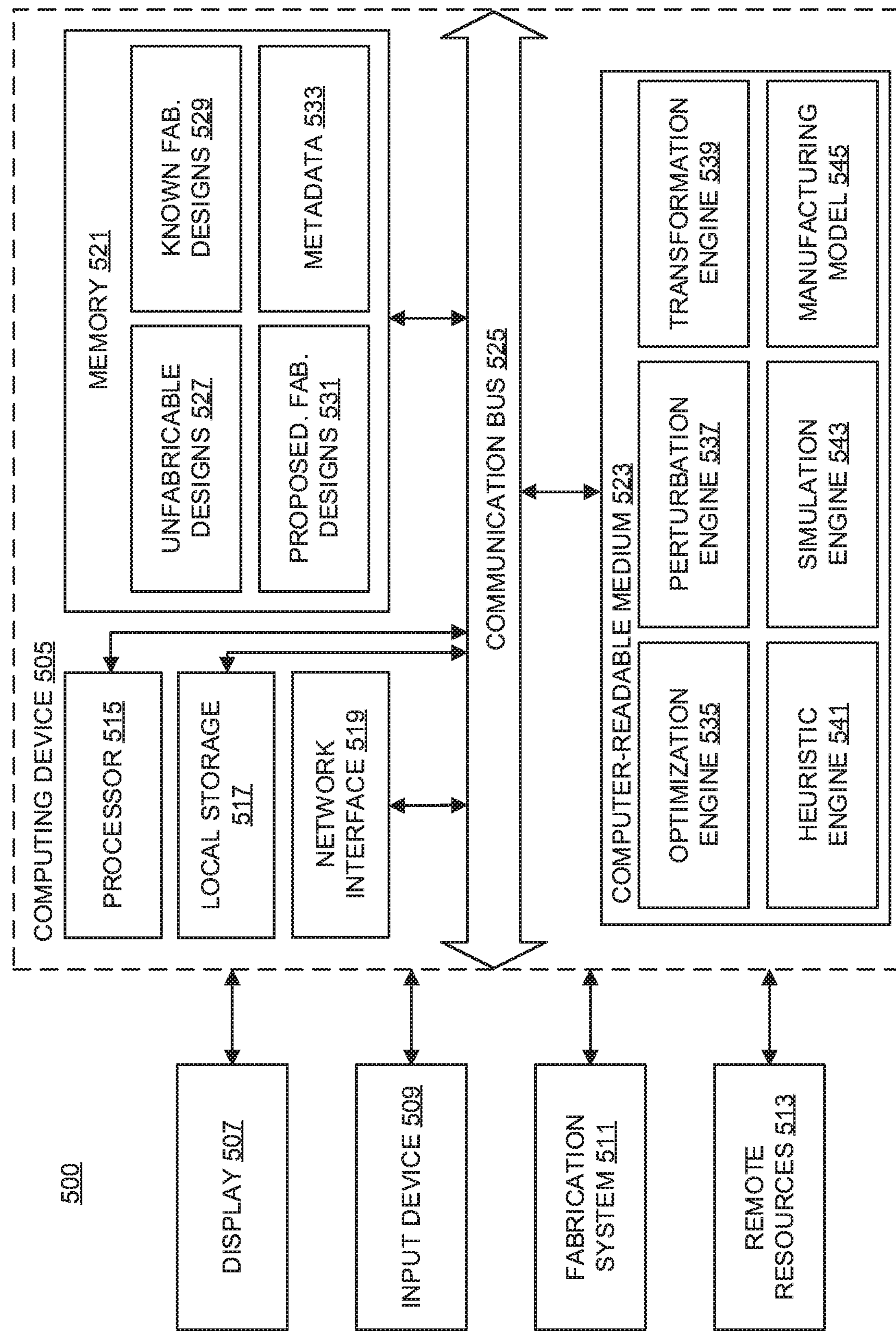
FIG. 5 is a block diagram illustrating a non-limiting example of a system for implementing an optimization process for optimizing designs of a physical device by transitioning between fabricable and unfabricable designs, in accordance with an embodiment of the present disclosure.

The simulated environment 100 and corresponding example rendering and operational simulation may be achieved via a physics simulator (e.g., system 500 illustrated in FIG. 5). In the illustrated embodiments, the physical device is described within the simulated environment 100 of FIG. 1A and FIG. 1B by a plurality of segments 105 (e.g., pixels) represented in two-dimensions. However, it is appreciated that higher (e.g., 3-dimensional space) and lower (e.g., 1-dimensional space) dimensionality may also be used to describe the physical device within the simulated environment 100.

FIG. 1A illustrates an example rendering of the simulated environment 100 describing the physical device, in accordance with an embodiment of the present disclosure. The illustrated embodiment is non-limiting and represents the simulated environment 100 at an initial time step (e.g., an initial set up) for optimizing structural parameters of the physical device. The physical device may correspond to an optical waveguide including an input port 115 and a plurality of output ports 120. A portion of the simulated environment 100 may correspond to a designable region 110 disposed between the input port 115 and the plurality of output ports 120. In some embodiments, structural parameters within the designable region 110 may be designed, modified, or otherwise changed, while structural parameters outside of the designable region may be fixed when optimizing the physical device. It is appreciated that the location and size of the designable region 110 is non-limiting and that in other embodiments the designable region 110 may encompass any portion or all the simulated environment 100.

As illustrated, the simulated environment 100 (and subsequently the physical device) is described by a plurality of segments 105, which represent individual elements of the two-dimensional (or three-dimensional) space of the simulated environment 100. Each of the segments 105 is illustrated as a two-dimensional square, however it is appreciated that the segments 105 may be represented as cubes or other shapes in three-dimensional space, or shapes other than squares in a two-dimensional environment. It is further appreciated that the specific shape and dimensionality of the plurality of segments 105 may be adjusted dependent on the simulated environment 100. Additionally, it is noted that only a portion of the plurality of segments 105 are illustrated to avoid obscuring other aspects of the simulated environment 100.

For simulation purposes, each of the plurality of segments 105 may be associated with a structural value, a field value, and a source value. Collectively, the structural values of the simulated environment 100 describe structural parameters of the physical device. In one embodiment, the structural values may correspond to a relative permittivity, permeability, and/or refractive index that collectively describe structural (i.e., material) boundaries of the physical device. For example, interface 107 is representative of where relative permittivity changes within the simulated environment 100 and may define a boundary of the physical device where a first material meets or otherwise interfaces with a second material. The field values of the plurality of segments describe the field response (e.g., electric, magnetic, acoustic, and/or fluidic response) that is calculated (e.g., via Maxwell's equations) in response to an excitation source (e.g., a Gaussian pulse, a wave, a waveguide mode response, and the like) described by the source value(s) that may originate at a specific position within the simulated environment 100. The field response, for example, may correspond to a collection of vectors (i.e., a tensor) describing the electric and/or magnetic fields (e.g., in one or more orthogonal directions) at a particular time step within the simulation for each of the plurality of segments 105. More specifically, individual vectors may correspond to a Yee lattice to discretize Maxwell's equations for determining the field response. In some embodiments, the field response is based, at least in part, on the structural parameters are the excitation source. It is appreciated that in some embodiments, each of the plurality of segments 105 may be associated with the presence or absence of a material. The material may be deposited or removed during manufacture using a photolithography system, an additive manufacturing system, or any other suitable type of fabrication system. For example, a physical device may include a first material (e.g., silicon) and a second material (e.g., silicon dioxide). The physical device may be fabricated on a silicon-on-insulator platform in which silicon is removed and subsequently treated to grow or deposit an oxide in place of the removed silicon to form the physical device. Thus, when considering fabricability when designing the physical device, it may be advantageous to have the structural parameters representative of the presence (or lack thereof) of a material (e.g., silicon).

FIG. 1B illustrates an example operational simulation of the physical device, in accordance with an embodiment of the present disclosure. In the illustrated embodiment, the physical device is an optical waveguide operating at one or more frequencies of interest and having one or more particular waveguide modes (e.g., transverse electric mode, transverse magnetic mode, or transverse electric and magnetic mode). The excitation source is at an input of the optical waveguide (e.g., the input port 115) having a specified spatial, phase, and/or temporal profile. The operational simulation occurs over a plurality of time steps, including the illustrated time step. When performing the operational simulation, changes to the field response (e.g., the field value) for each of the plurality of segments 105 are incrementally updated in response to the excitation source over the plurality of time steps. The changes in the field response at a particular time step are based, at least in part, on the structural parameters, the excitation source, and the field response of the simulated environment 100 at the immediately prior time step included in the plurality of time steps. Similarly, in some embodiments the source value of the plurality of segments 105 is updated (e.g., based on the spatial profile and/or temporal profile describing the excitation source). It is appreciated that the operational simulation is incremental and that the field values (and source values) of the simulated environment 100 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize) or otherwise concludes, one or more performance metrics of the physical device may be determined. In some embodiments, the excitation source of the operational simulation may comprise a pulse. In such a scenario, the operational simulation may conclude once the intensity of the pulse has substantially dissipated. In other embodiments, the performance metric may be ascertained without waiting for the excitation source to dissipate. In the same or other embodiments the operational simulation may be considered to have reached a steady state once the field values reach a null value. In one embodiment, the performance metric corresponds to the output mode of the optical waveguide at the plurality of output ports 120. In the same or other embodiments, the performance metric represents power (at one or more frequencies of interest) in the target mode shape at the specific locations of the plurality of output ports 120. It is appreciated that the described performance metrics are non-limiting, and that other performance metrics dependent on the design and functionality of the physical device may be utilized.

FIGS. 2A-2D illustrate flowcharts and corresponding blocks for an optimization process that may generate a target fabricable design of a physical device by transitioning between fabricable designs and unfabricable designs, in accordance with embodiments of the present disclosure. The optimization process may be implemented, at least in part, utilizing a physics system to simulation performance of a segmented design as shown in FIGS. 1A-1B.

Figure 2A:
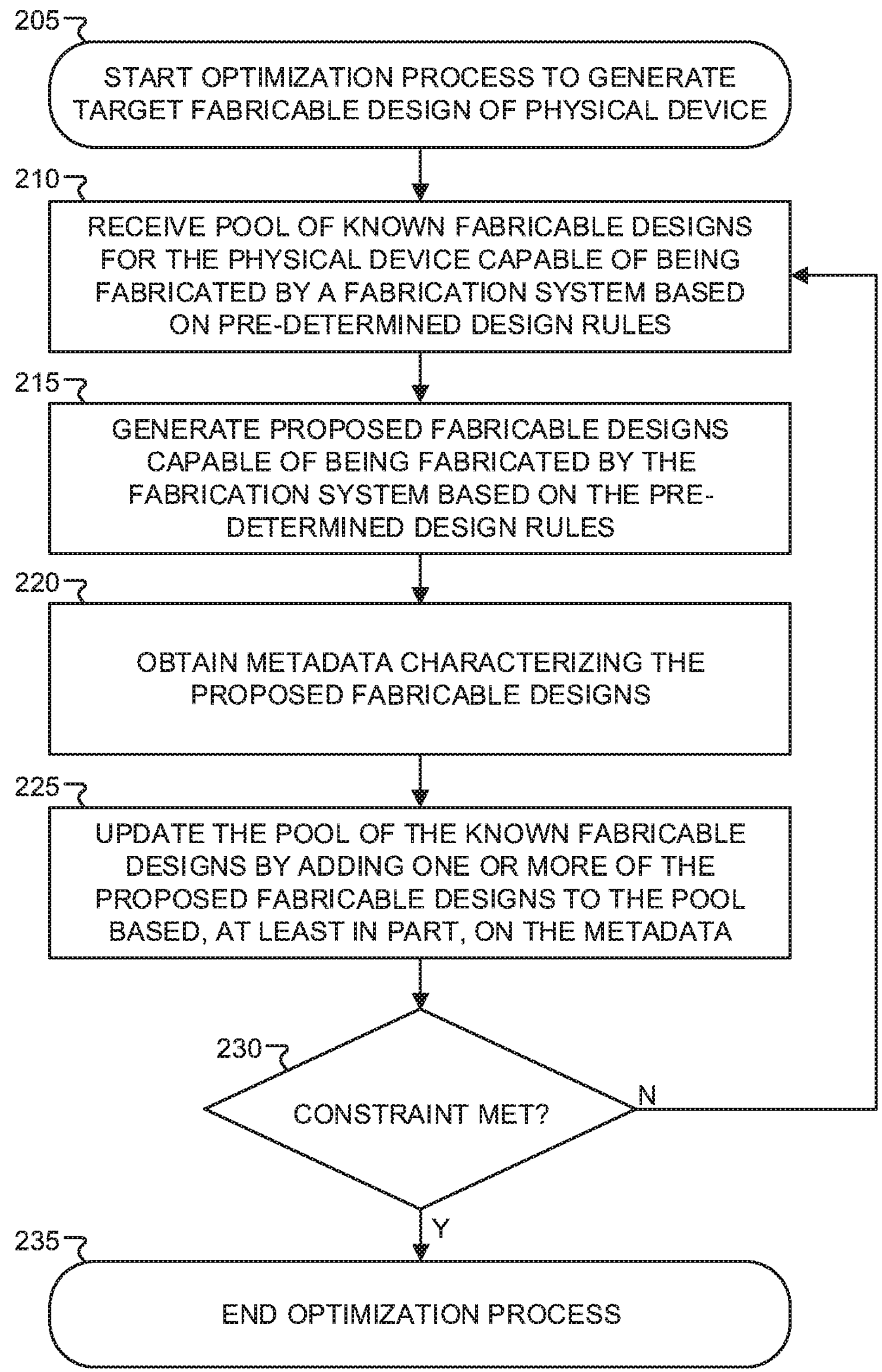
FIGS. 2A-2D illustrate flowcharts are corresponding blocks for an optimization process to generate a target fabricable design of a physical device by transitioning between fabricable designs and unfabricable designs, in accordance with embodiments of the present disclosure.

FIG. 2A illustrates flowchart 200, which is an optimization process to generate a target fabricable design of a physical device by transitioning between fabricable designs and unfabricable designs, in accordance with embodiments of the present disclosure. As illustrated, flowchart 200 is an iterative process that may initiate at start block 205 sequentially continue through blocks 210, 215, 220, and 225 to a decision block 230. Decision block 230 proceeds to an end block 235 that terminates the optimization process or returns to block 210 dependent on the results of the decision block 230. It is appreciated that each cycle from block 210 to block 230 may be considered an iterative cycle included in a plurality of iterative cycles and that the iterative cycles may proceed sequentially and/or in parallel during the optimization process. Furthermore, it is appreciated that each block within FIG. 2A may represent multiple subprocesses that may be further proceed sequentially or in parallel with each other block included in the optimization process.

It is noted that in the illustrated embodiment, flowchart 200 represents a high-level diagram of the optimization process that generates a target fabricable design of a physical device by transitioning between fabricable and unfabricable designs. This optimization process traverses the design space of a segmented design that may include an intractable number of permutations. However, to reduce the number of permutations, exploration of the design space is generally limited to permutations of the segmented design that are considered fabricable with respect to one or more pre-determined design rules. As illustrated, flowchart 200 appears to only consider permutations of the segmented design that are fabricable, but it is appreciated that certain blocks (e.g., block 215) may briefly explore permutations that are unfabricable to avoid being limited to local solutions within the design space. This allows for a reduced number of permutations to be explored relative to the total number of possible permutations of the segmented design and may also limit certain computationally expensive aspects (e.g., simulation of the physical device) of the optimization process to permutations of the segmented design that are fabricable.

Block 205 illustrates an initialization of the optimization process to generate a target fabricable design of a physical device. Initialization may include providing target parameters (e.g., performance metrics, yield, robustness, variance, or any other characteristic qualifying or otherwise describing a target fabricable design of the physical device). The initialization may further include configuration of parameters related to the operational simulation and simulated environment describing the physical device (e.g., as illustrated in FIG. 1A-1B). In one embodiment, initialization of the optimization process 200 may include defining characteristics of the simulated environment (e.g., total area or volume, segment size, segment pattern, material or other physical characteristics of the segments, designable region size and position, and the like). In the same or other embodiments, the initialization may include providing pre-determined design rules for the physical device.

Block 210 shows receiving a pool of known fabricable designs for the physical device, each of the known fabricable designs capable of being fabricated by the fabrication system based on the pre-determined design rules. The pool, as initially received, may include any number of known fabricable designs (e.g., one design, hundreds of designs, and the like). It is appreciated that the known fabricable designs may be randomly generated designs that are considered compliant with the pre-determined design rules. For example, a distribution of known fabricable designs that are randomly or pseudorandomly generated may allow for local exploration of the design space of the segmented design that are well distributed throughout the range of permutations. This may allow for reduced bias towards a particular design or mitigate entrapment at a local minima (i.e., solution) when searching for the target fabricable design with the design space. In some embodiments, each of the known fabricable designs included in the pool of known fabricable designs may include known metadata associated with the individual designs. The known metadata may include results from a simulation (e.g., the operational simulation illustrated in FIG. 1B) and include one or more performance metrics, fabrication metrics, and/or any other characteristic describing the design before, during, and/or after manufacture. In the same or other embodiments, the known metadata of one or more of the known fabricable designs included in the pool may include measured data (e.g., corresponding to one or more of the performance metrics or fabrication metrics).

Block 215 illustrates generating proposed fabricable designs capable of being fabricated by the fabrication system based on the pre-determined design rules. In some embodiments, the proposed fabricable designs are generated based, at least in part, on one or more known fabricable designs selected from the pool of known fabricable designs. In the same or other embodiments, the proposed fabricable designs may be generated randomly or pseudorandomly.

Block 220 shows obtaining metadata characterizing the proposed fabricable designs. Metadata may be obtained by evaluating the proposed fabricable designs, which may be achieved using a physics simulator and/or fabrication model (see, e.g., system 500 of FIG. 5), to generate one or more performance metrics (e.g., output mode, power, and the like), fabrication metrics (e.g., expected yield, expected robustness, expected variance, and the like), or any other characteristic describing the physical device with the proposed fabricable designs and/or underlying parameters of the models used to evaluate the proposed fabricable designs. The metadata for individual designs included in the proposed designs may further include a history of a given design. For example, if the given design was derived from one or more other designs (e.g., any subset up to and including the entire tree of design combinations leading to the given design), that information may be included as metadata associated with that given design. In some embodiments, the metadata may include simulation information (e.g., confidence of the simulation, parameters of the simulation, performance information, and the like). In one embodiment, the performance information may include performance gradients for the individual segments of the segmented design, which describe an influence of the structural parameter of a given segment of the design on the performance metrics of the physical device.

Block 225 illustrates updating the pool of the known fabricable designs by adding one or more of the proposed fabricable designs to the pool based, at least in part, on the metadata. In some embodiments, determining which of the proposed fabricable designs to be included in the pool of the known fabricable designs may be tied to the metadata related to one or more performance metrics of the proposed fabricable designs. For example, a best performing one of the proposed fabricable designs having a performance metric closest to a target performance metric of the target fabricable design may be added to the pool. In the same or other embodiments, a best N performing designs (e.g., N is greater than 1 such as 10, 50, 100, or any other subset of the total number of proposed designs) are selected to be included in the pool based, at least in part, on the performance metric included in the metadata. In some embodiments, metadata other than or in addition to the performance metrics may be used to determine which (or whether) to add proposed fabricable designs to the pool such as fabrication metrics, simulation information, and the like.

In the same or other embodiments, designs included from the proposed fabricable designs may be selected uniformly randomly or randomly weighted based on the metadata (e.g., performance metrics, fabrication metrics, simulation information, or a combination thereof) to determine which designs are to be included within the pool of the known fabricable designs. For example, each of the proposed fabricable designs may be weighted based on one or more of the performance metrics relative to the target performance metric. A pre-determined number of designs (e.g., 10, 50, 100, and the like) may then be selected pseudorandomly with higher performing designs more likely to be selected than lower performing designs.

Block 230 is a decision block that shows determining whether one or more constraints have been met. If the one or more constraints are met, then the optimization process proceeds to block 235 and terminates. However, if the one or more constraints are not met then a new iterative cycle of the optimization process begins and the optimization process continues. In some embodiments the constraint is based on target parameters of the target fabricable design. For example, iterative cycles may be performed until the performance metric of at least one of the known fabricable designs meets a target performance metric of the target fabricable design. Each of the iterative cycles may include receiving the pool of the known fabricable designs (e.g., block 210), generating the proposed fabricable designs (e.g., block 215), obtaining the metadata (e.g., block 220), and updating the pool based on the metadata (e.g., block 225). In the same or other embodiments, the constraint may be based on other conditions such as available resources, cost, etc. For example, if a budget of time or cost is assigned to the optimization process then the iterative cycles may continue until the budget is reached even if the target fabricable design is found beforehand. This may be advantageous when the extent of performance variability within the design space is unknown. In other embodiments there may be no target fabricable design and instead the iterative cycles may continue until the budget is reached. In such a scenario, updating the pool (e.g., block 225) may be based on absolute performance metrics rather than relative performance metrics.

In some embodiments, the pool of the known fabricable designs may be further managed as the number of the iterative cycles increases. Thus, in one embodiment, block 230 may include removing one or more of the known fabricable designs from the pool, which may be removed based on the known metadata associated with the known fabricable designs. In some embodiments, the worst performing (e.g., relative to the target fabricable design or on an absolute scale) may be removed. In the same or other embodiments, other factors such as fabrication metrics or simulation information may also be used when deciding which of the known fabricable designs are to be removed from the pool.

In the embodiments described herein, designs of the physical device may be defined as "fabricable" or "unfabricable." It is appreciated that "fabricable" designs are believed to be fabricable with a known fabrication process by complying with the pre-determined design rules. Alternatively, "unfabricable" designs violate the pre-determined design rules and thus are believed, at least in part, to be unfabricable. In some embodiments, the pre-determined design rules may correspond to geometric limitations such as a minimum feature size, minimum separation distance, and the like. In one embodiment, the pre-determined design rules may include limitations or constraints of the physical device (e.g., the physical device may be constrained to only include a first material and a second material, may not contain certain forbidden patterns, or other constraints). In the same or other embodiments, the pre-determined design rules may be provided (e.g., by a user implementing the optimization process, a manufacturer of the fabrication system, a foundry, and the like), determined (e.g., by modeling the fabrication system or devices fabricated by the fabrication system), or otherwise obtained. In some embodiments the pre-determined design rules may be universal or generic design rules for the physical device that apply equally over the designable region. In the same or other embodiments, there may be pre-determined design rules specific to one or more regions of the physical device. For example, proximate to an outer boundary of the physical device, the pre-determined design rules may change or otherwise include rules not necessarily applicable in other regions of the physical device.

It is further appreciated that in embodiments described herein "designs" such as the target fabricable design, the known fabricable designs, the proposed fabricable designs, the unfabricable designs, and the variations of any of these respective designs may be described in the context of the physical device. In embodiments of the present disclosure the designs may describe the physical device at any stage before, during, or after manufacturing and may be all encompassing designs (e.g., fully describe the physical device) or constitute one or more partial designs (e.g., describe portions of the physical device such as a designable region as shown in FIGS. 1A-1B).

Figure 2B:
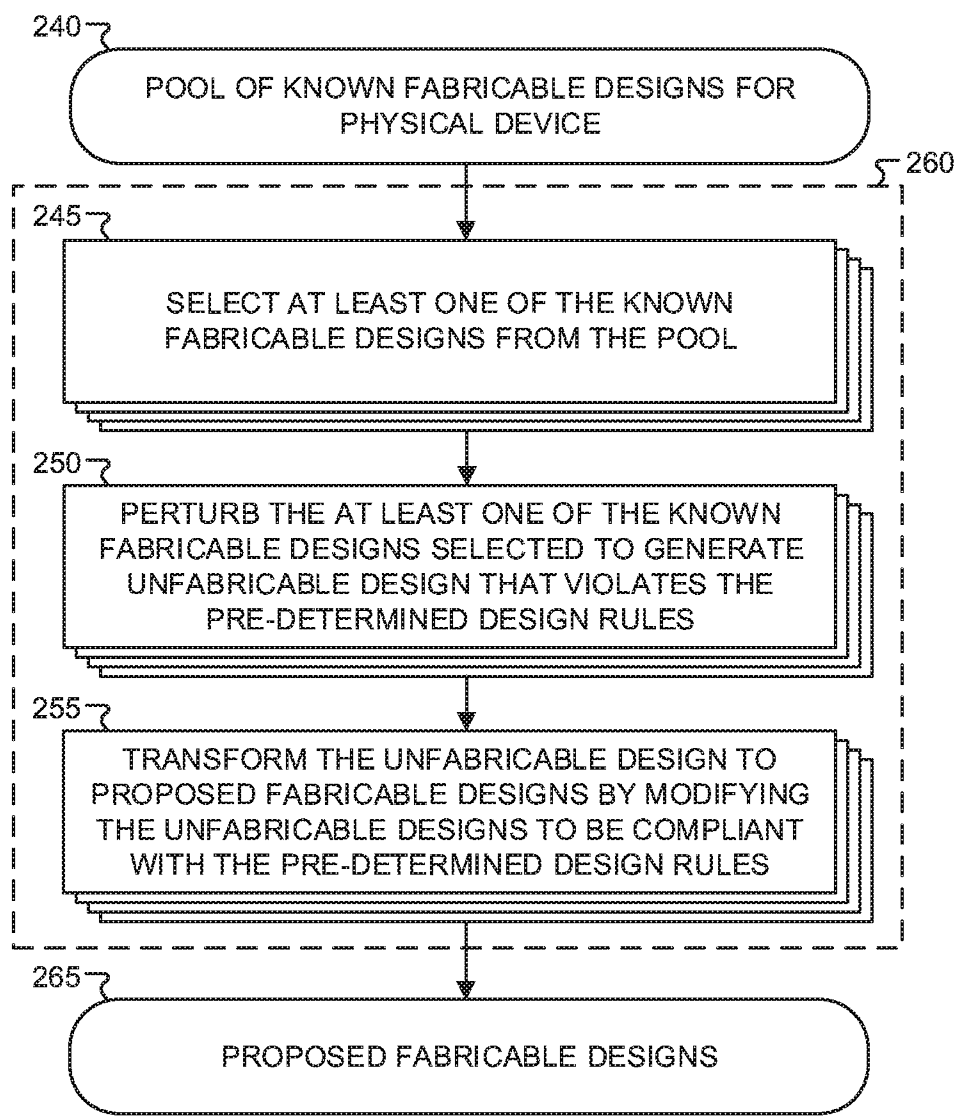

FIG. 2B illustrates a non-limiting example of block 215 included in flowchart 200 for generating proposed fabricable designs capable of being fabricated by the fabricated system based on the pre-determined design rules, in accordance with embodiments of the present disclosure. As illustrated, block 215 shows the pool of known fabricable designs 240 describing the physical device being utilized to generate one or more unfabricable designs that are subsequently transformed into proposed fabricable designs 265. In accordance with embodiments of the present disclosure, block 215 allows for the optimization process to consider unfabricable designs without necessarily committing to the cost (e.g., computational, temporal, financial, and the like) of evaluating the unfabricable designs.

Block 245 illustrates selecting at least one of the known fabricable designs from the pool of known fabricable designs 240. As illustrated, there may be a plurality of different ways to select the at least one of the known fabricable designs, which may be considered concurrently and/or sequentially. In embodiments, none of the designs from the known fabricable designs may be selected, a single one of the known fabricable designs may be selected, a subset of the known fabricable designs may be selected, or all of the known fabricable designs included in the pool of the known fabricable designs 240 may be selected. In embodiments where no design is selected (e.g., as one of the iterative cycles of the optimization process), data in the pool may be ignored and one or more random fabricable or unfabricable designs may be generated (e.g., at an initial stage of the optimization process in which the pool of known fabricable designs may include a limited number of designs or when diversity of the designs with respect to the number of permutations within the design space is lacking).

In the same or other embodiments, the at least one of the known fabricable designs may be selected randomly, based on known metadata (e.g., performance metrics, fabrication metrics, simulation information, or a combination thereof) associated with the known fabricable designs included in the pool of known fabricable designs 240, or a combination of thereof. In one embodiment, the at least one of the known fabricable designs is selected randomly weighted by performance (e.g., one or more of the performance metrics) associated with the known metadata for each of the known fabricable designs. In the same or other embodiments, a best performing one or a top performing subset of the known fabricable designs may be selected from the pool of known fabricable designs 240. In one embodiment, a top M (e.g., any integer number greater than 1 such as 100) best performing designs included in the known fabricable designs may be selected and subsequently a subset of those top M best performing designs may be randomly selected. It is appreciated that the term "best performing" or "top performing" may be a relative term (e.g., parameters of the known fabricable designs compared to the target parameters of the target fabricable design) or an absolute term (e.g., parameters of the known fabricable designs compared to one another). The comparison may be based on an individual metric included in the known metadata or may be a combination of metrics. In one or more embodiments, the known metadata may include measured data (e.g., measured performance of a fabricated one of the known fabricable designs), which may be given preference over simulated performance data when selecting the at least one of the known fabricable designs.

Block 250 shows perturbing the at least one of the known fabricable designs (i.e., the designs selected from block 245) to generate one or more unfabricable designs that violate the pre-determined design rules. As described in embodiments of the disclosure, the known fabricable designs are segmented designs including a plurality of segments (e.g., pixels or voxels). From a high-level, perturbing means to change one or more of the structural parameters or structural values describing at least one of the individual segments of a given design to generate a new design that is likely unfabricable or otherwise violates the pre-determined design rules.

As illustrated, a variety of techniques may be utilized for perturbing the at least one of the known fabricable designs. In embodiments of the present disclosure, perturbations may be locally (e.g., targeting one or more segments) or globally (e.g., targeting all of the segments in a given design) applied to generate the one or more unfabricable designs. For example, a local perturbation may correspond to randomly selecting one or more of the segments describing a given design and flipping (e.g., changing between a first value and a second value) the corresponding structural value of the structural parameters. In some embodiments the structural parameter may describe the type of material the segment is made up of (e.g., silicon or silicon dioxide) or may describe whether a material is present (e.g., includes silicon or does not include silicon). Global perturbations may correspond to a transformation applied across the entirety of a given design. For example, a function applied to given design may result in the design being stretched, twisted, or otherwise transformed. In the same or other embodiments, one or more of the segments may be pushed into unfabricable values. For example, if the structural parameter of a segment represents a first material or a second material (e.g., 0 or 1), the structural parameter of a given segment may be pushed into a blend of the first and the second material (e.g., a value between 0 and 1), which may be considered unfabricable. In another example, the at least one of the known fabricable designs may be perturbed by being combined with another design included in the at least one of the known fabricable designs selected at block 245. For example, a portion of a first design and a portion of a second design may be combined to form an unfabricable design.

Block 255 illustrates transforming the one or more unfabricable designs to the proposed fabricable designs 265 by modifying the one or more unfabricable designs to be compliant with the pre-determined design rules. In most embodiments, the proposed fabricable designs 265 are different than the at least one of the known fabricable designs selected from the pool of known fabricable designs 240. In other words, by generating the unfabricable designs and then transforming the unfabricable designs into the proposed fabricable designs, the optimization process allows for temporary exploration of unfabricable designs included in the design space without the cost of evaluating (e.g., in terms of performance or fabrication metrics) the unfabricable designs themselves.

As illustrated a variety of techniques may be utilized to transform the unfabricable designs by modifying the unfabricable designs to be compliant with the pre-determined design rules. In embodiments of the disclosure, transforming the unfabricable designs to the proposed fabricable designs may be more generally referred to as "snapping" the design to a nearby (e.g., in terms of design space) fabricable design. This allows for the unfabricable design space to be explored by the optimization process to find one or more fabricable designs that are comparable to the unfabricable design. In one embodiment, nearby fabricable designs may be found by finding variations of the unfabricable designs that are fabricable and subsequently selecting one or more of the variations that are closest (e.g., in terms of Hamming distance) to the unfabricable design (e.g., "snap" the unfabricable design to the nearby fabricable design) to be included in the proposed fabricable designs.

Block 260 shows meta optimization using a heuristic engine or algorithm. As shown in FIG. 2B, there may be a variety of techniques that may be used for each of block 245, 250, and 255. In some embodiments, each of those techniques may be selected randomly per iterative cycle of the optimization process by the heuristic engine. However, in other embodiments the heuristic engine or algorithm may utilize feedback (e.g., quality of the designs produced to be included in the proposed fabricable designs) to determine which of the techniques (or combination of techniques) may be used for each of block 245, 250, and 255 for a given one of the iterative cycles included in the optimization process, which may be achieved, for example, via Thompson sampling. This allows the optimization process to take advantage of situations in which combinations of techniques (e.g., from blocks 245-255) are particularly well suited for one another.

Figure 2C:
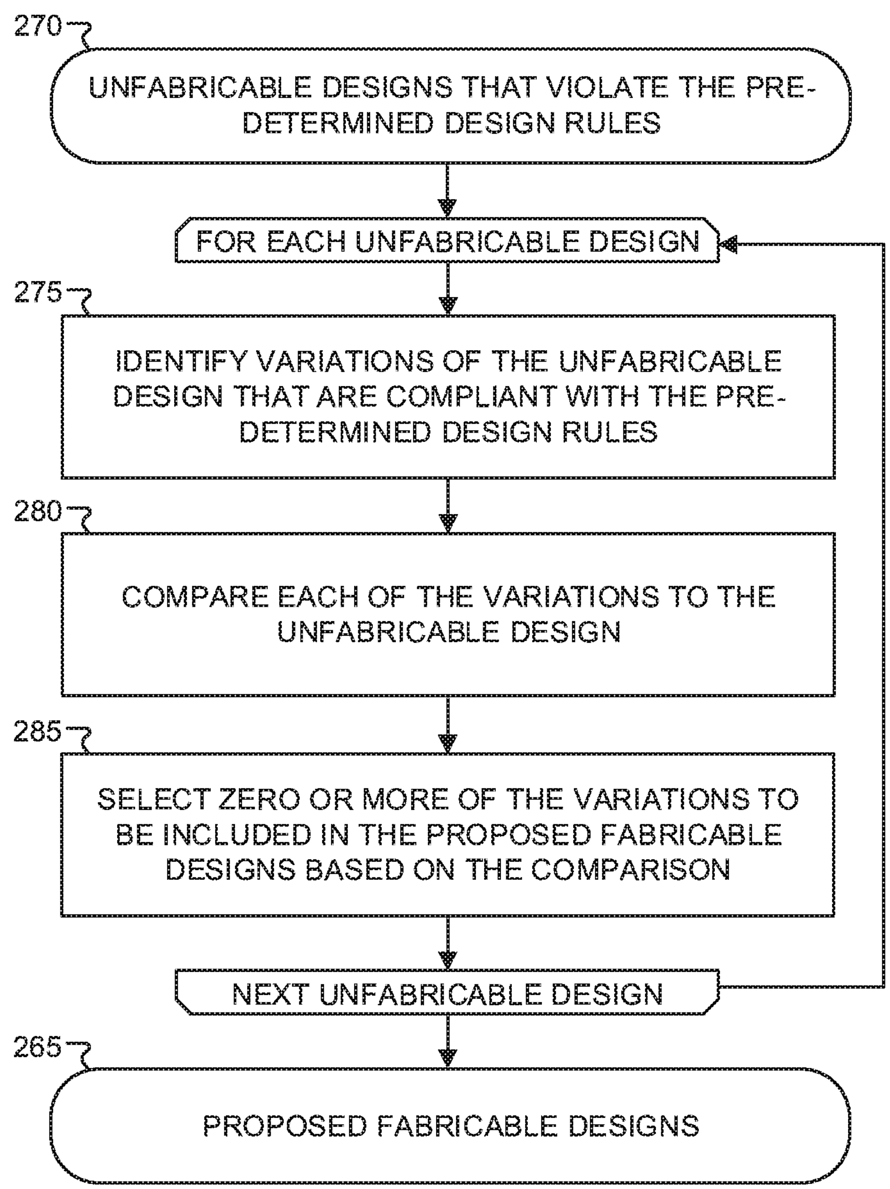

FIG. 2C illustrates a non-limiting example of block 255 included in block 215 of the optimization process for transforming the unfabricable designs 270 that violate the pre-determined design rules to the proposed fabricable designs 265 by modifying the unfabricable designs 270 to be compliant with the pre-determined design rules, in accordance with embodiments of the present disclosure. In other words, block 215 illustrates a non-limiting example of how to "snap" a given unfabricable design to a nearby fabricable design to be included in the proposed fabricable designs. In some embodiments, the unfabricable designs 270 correspond to the unfabricable designs generated by block 250 illustrated in FIG. 2B. Referring back to FIG. 2C, block 255 shows a loop that may be applied individually to any subset or all of the designs included in the unfabricable designs 270 to generate the proposed fabricable designs 265.

Block 275 illustrates identifying variations of the one or more unfabricable designs that are compliant with the pre-determined design rules. In embodiments of the disclosure there may be several techniques available to identify the variations of a given unfabricable design. In one embodiment, all possible designs permutations within a fabricable design space (e.g., all designs that comply with the pre-determined design rules) may be enumerated, which would include all variations of the given unfabricable design. In another embodiment, the pre-determined design rules may be utilized to generate one or more templates to modify the unfabricable design. For example, if the pre-determined design rules indicate that features must be at least two-by-two segments in shape then said shape could be utilized as a "paintbrush" to trace (e.g., "paint") over the given unfabricable design and generate a corresponding variation. There may be multiple different ways to "paint" over the unfabricable design, with each different way considered a different one of the variations. In one embodiment, forbidden patterns derived from the pre-determined design rules may be utilized to identify segments of the given unfabricable design that contain one or more of the forbidden patterns. The identified segments with the forbidden patterns may then be transformed such that the forbidden pattern is no longer contained, which would generate one of the variations of the unfabricable design that are compliant with the pre-determined design rules.

Block 280 shows comparing each of the variations to the unfabricable design. In some embodiments, each of the variations may be compared segment by segment (e.g., positionally common values of the structural parameter) between a given one of the variations and the unfabricable design. In other embodiments groups of segments may be compared. Subsequently, based on the comparison each of the variations may be ranked depending on how "close" a given variation is to the unfabricable design. For example, the total number of different segments between each of the variations and the unfabricable design may be counted to rank each of the variations.

Block 285 illustrates selecting zero or more of the variations to be included in the proposed fabricable designs 265 based on the comparison. In some embodiments, one or more of the variations may be selected to be included in the proposed fabricable designs 265 based on the comparison of block 280. For example, the total number of different segments between each of the variations and the unfabricable design may be counted and the variations with the fewest amount of differences may be selected to be included in the proposed fabricable designs. It is appreciated that in some embodiments a subset of the variations may be selected to be included in the proposed fabricable designs rather than just the closest one of the variations. For example, any one of the variations within a threshold distance from the unfabricable design may be included in the proposed fabricable designs. In same or other embodiments, the ranking of the variations may be used to determine which of the variations should be included in the proposed fabricable designs (e.g., top N designs or M designs selected randomly from the top N designs). In some embodiments, blocks 275 and 280 may collectively be utilized to determine a first variation included in the variations that is closest to the one or more of the unfabricable designs 270 that is to be included in the proposed fabricable designs.

Figure 2D:
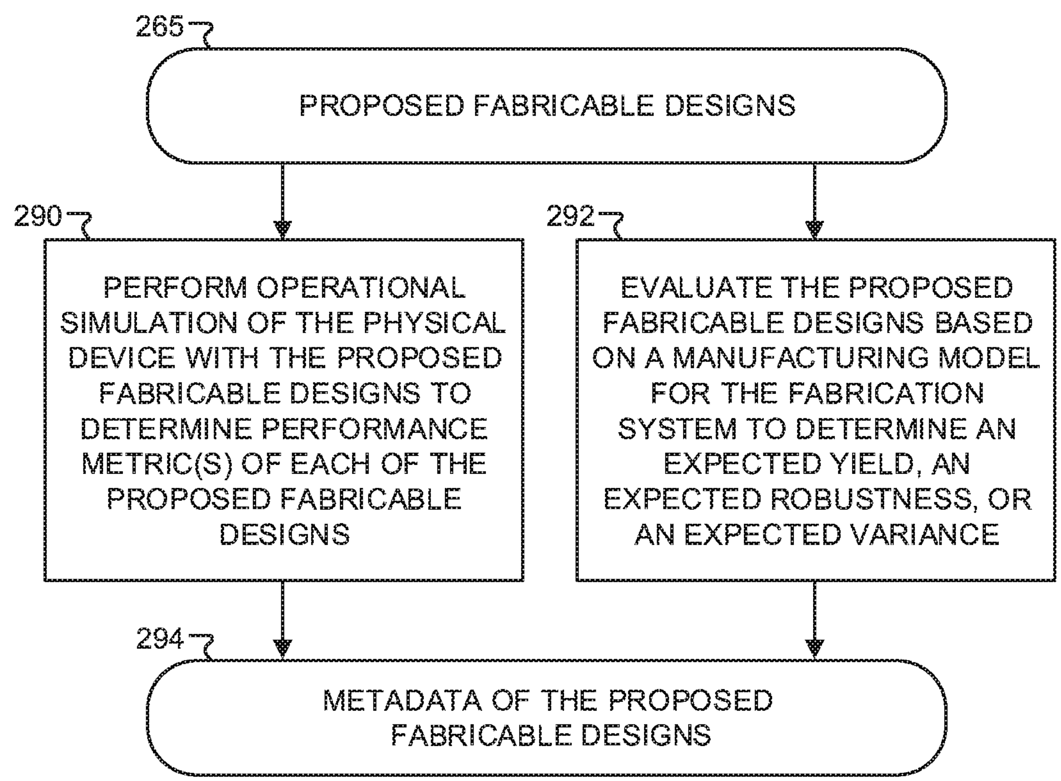

FIG. 2D illustrates a non-limiting example of block 220 included in flowchart 200 of the optimization process for obtaining metadata 294 characterizing or otherwise evaluating the proposed designs 265.

Block 290 illustrates performing an operational simulation of the physical device with the proposed fabricable designs 265 to determine one or more performance metrics for each of the proposed fabricable designs. The operational simulation may be a physics-based simulation that simulates the field response of the proposed design to determine one or more performance metrics as described in reference to FIGS. 1A-1B.

Block 292 shows evaluating the proposed fabricable designs based on a manufacturing model for the fabrication system to determine an expected yield, an expected robustness, or an expected variance of the proposed fabricable designs. The manufacturing model may be tailored to a particular fabrication system for manufacturing the physical device. In some embodiments, the manufacturing model may trained to receive a segmented design corresponding to any one of the proposed fabricable designs and in response simulates fabrication of the physical device with the fabrication system and subsequently outputs one or more fabrication metrics (e.g., an expected yield, an expected robustness, an expected variance, or any other metric that characters the proposed fabricable device with respect to fabrication). The expected yield may correspond to a percentage of devices that will be within a threshold difference of the proposed fabricable design when the proposed fabricable design is manufactured. The expected robustness may be related to how robust the proposed fabricable design is to different operating conditions when the proposed fabricable design is manufactured. The expected variance may correspond to how much the manufactured proposed fabricable design will vary when the proposed fabricable design is manufactured.

Outputs produced from blocks 290 and 292 are associated with the metadata 294 of corresponding designs included in the proposed fabricable designs 265. For example, performance metrics obtained during the operational simulation of a given one of the proposed fabricable designs 265 will be associated with the metadata of that given one of the proposed fabricable designs 265. In some embodiments, additional information not associated with the operational simulation and/or manufacturing model may additionally be associated with the metadata 294, which may be any information characterizing the proposed fabricable designs 265 (e.g., design history).

It is appreciated that blocks 290 and 292 may be performed in parallel or sequentially for a given one of the proposed designs 265. In some embodiments, certain performance or fabrication metrics may be considered "optional" and thus may not be generated by block 220. In other words, either of block 290 or 292 may be skipped depending on a given embodiment of the optimization process of the present disclosure.

FIGS. 3A-3E are schematic drawings that illustrate non-limiting examples for perturbing fabricable designs to generate unfabricable designs that violate pre-determined design rules of a fabrication system, in accordance with embodiments of the present disclosure. The schematic drawings of FIGS. 3A-3E may be one possible implementation of block 215 in flowchart 200 illustrated in FIG. 2A.

FIG. 3A illustrates a first design 310, a second design 320, and a third design 330 of a physical device, in accordance with embodiments of the present disclosure. In the illustrated embodiment, the first design 310, the second design 320, and the third design 330 are segmented designs selected from the pool of the known fabricable designs. As shown, the structural parameters of each of the designs the first design 310, the second design 320, and the third design 330 are illustrated as either a "0" or a "1" as the structural value for each of the segments. In some embodiments, the pre-determined design rules may restrict each of the known fabricable designs to include a first material and a second material. In such an embodiment, the structural value may correspond to the first material or the second material. In other embodiments, the structural value may correspond to whether a first material is present. In other embodiments, the structural value may be representative of any number of materials and/or physical characteristics describing a given segment of the physical device. In some embodiments, the first design 310, the second design 320, and the third design 330 are designs selected to be perturbed (e.g., block 245 of FIG. 2B) that are included in the at least one of the known fabricable designs.

FIG. 3B is a non-limiting example of unfabricable design 340 generated by perturbing the at least one of the known fabricable designs, in accordance with an embodiment of the present disclosure. The unfabricable design 340 is generated by combining a portion of the first design 310 and the second design 320. More specifically, the illustrated embodiment shows a left half 342 of the first design 310 combined with a right half 344 of the second design 320 combined together to generate the unfabricable design 340. It is appreciated that in other embodiments different combinations may be possible and that greater than two designs may be combined.

FIG. 3C is a non-limiting example of unfabricable design 350 generated by perturbing the at least one of the known fabricable designs, in accordance with an embodiment of the present disclosure. The unfabricable design 350 is generated by perturbing the third design 330 by shifting or flipping the structural parameters of one or more of the segments included in the third design 330. For example, segments 352 and 354 have had their corresponding structural values flipped to an opposite value to switch the material describing the segment between the first material and the second material (e.g., segment 352 had a structural value of "1" in the third design 330, but upon perturbation the structural value of segment 352 is "0").

In the same or other embodiments, the unfabricable design 350 may be generated by shifting the structural parameter of one or more of the segments included in the at least one of the known fabricable designs to be representative of a blend of the first material and the second material. For example, segments 356 and 358 have been shifted from their respective values of "0" and "1" in the third design 330 to a blend of the first material and the second material corresponding to "0.1" and "0.9" respectively. In such an embodiment, the structural value may correspond to ratio of an individual material (e.g., the first material) with respect to a different material (e.g., the second material). Thus, a structural value of 0.9 may correspond to a blend of 90% the first material and 10% the second material, for example.

It is appreciated that in various embodiments of the disclosure any number of segments may be selected for flipping and/or shifting structural values. It is further appreciated that in some embodiments the segments to be flipped or shifted may be selected at random. In the same or other embodiments nonrandom selection of the segments to be flipped or shifted may be utilized.

FIG. 3D is a non-limiting example of unfabricable design 360 generated by perturbing the at least one of the known fabricable designs, in accordance with an embodiment of the present disclosure. In the illustrated embodiment, a linear combination of the first design 310 and the second design 320 is performed that averages the structural parameters (e.g., the structural value segment by segment) included in the segments for positionally common pairs of the segments included in the first design 310 and the second design 320. In other embodiments, perturbation of the at least one of the fabricable designs may include a linear combination of any number of the designs included in the pool of the fabricable designs.

FIG. 3E is a non-limiting example of unfabricable design 370 generated by perturbing the at least one of the known fabricable designs, in accordance with an embodiment of the present disclosure. Unfabricable design 370 is generated by "majority voting" in which linear combination of the first design 310, the second design 320, and the third design 330 is performed and the resultant structural value for each of the segments is rounded to a nearest integer representative of a material (e.g., the first material or the second material). More specifically, the structural parameter for positionally common sets of the segments are averaged and subsequently rounded to generate the unfabricable design 370.

It is appreciated that the perturbation techniques for generating unfabricable designs (e.g., the unfabricable design 360 of FIG. 3D and the unfabricable design 370 of FIG. 3E) are performed segment-by-segment. However, in other embodiments perturbation techniques may be performed on groups of segments. For example, two-by-two groups of segments for the first design 310 may be averaged and subsequently linearly combined with positionally common two-by-two groups of segments in the second design 320.

Figures 4A, 4B, 4C:
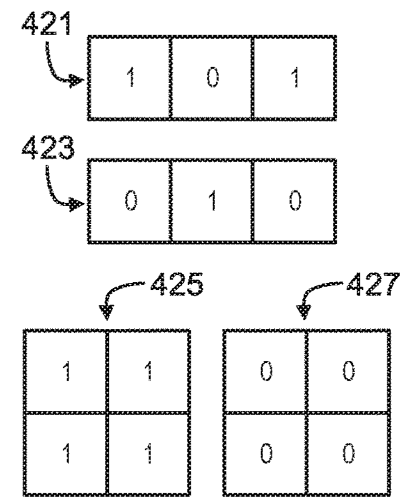
FIGS. 4A-4C are schematic drawings that illustrate non-limiting examples for transforming an unfabricable design to a proposed fabricable design by modifying the unfabricable design to be compliant with pre-determined design rules, in accordance with embodiments of the present disclosure.

FIGS. 4A-4C are schematic drawings that illustrate non-limiting examples for transforming an unfabricable design to a proposed fabricable design by modifying the unfabricable design to be compliant with pre-determined design rules, in accordance with embodiments of the present disclosure. The schematic drawings of FIGS. 4A-3C may be one possible implementation of block 215 in flowchart 200 illustrated in FIG. 2A.

FIG. 4A illustrates a non-limiting example of unfabricable design 415 that has been generated by perturbing fabricable designs, in accordance with embodiments of the present disclosure. The unfabricable design 415 is a segmented design of the physical device that violates pre-determined design rules of the fabrication system.

FIG. 4B shows non-limiting examples of pre-determining design rules 421, 423, 425, and 427 of a fabrication system, in accordance with embodiments of the present disclosure. In the illustrated example, the pre-determined design rules 421, 423, 425, and 427 in context of fabricable designs being restricted to containing segments with a first material or a second material (e.g., structural value of each segment denoted as being "0" or "1"). However, in other embodiments, the pre-determined design rules may restrict segments to contain a first material or not contain the first material (e.g., structural value of "0" or "1").

In the illustrated embodiment, the pre-determined design rules 421 and 423 correspond to a minimum width or separation spacing between features of fabricable designs. More specifically, pre-determined design rules 421 and 423 are forbidden patterns that cannot be included in a design that is considered fabricable. In other words, material changes within a segmented design should include at least two of a common structural value to be considered fabricable. It is appreciated that pre-determined design rules 421 and 423 include any rotation or mirror of the group of segments that form the pre-determined design rule. The pre-determined design rules 425 and 427 represent a minimum feature size of the fabrication system with respect to the size of segments. More specifically, the minimum feature size may restrict features of fabricable designs to be describable by one or more combinations of the pre-determined design rules 425 and 427. It is appreciated that pre-determined design rules 425 and 427 include any rotation or mirror of the group of segments that form the pre-determined design rule. Accordingly, the unfabricable design 415 violates each of the pre-determined design rules 421, 423, 425, and 427 and thus is not considered a fabricable design.

FIG. 4C illustrates non-limiting examples of variations 435 and 445 of the unfabricable design 415, in accordance with embodiments of the present disclosure. The variations 435 and 445 are transformation of the unfabricable design 415 that are generated by modifying the unfabricable design 415 to be compliant with the pre-determined design rules. In the illustrate embodiment, the variations 435 and 445 are obtained by using the one or more of the pre-determined design rules 425 or 427 as "paintbrushes" to trace of the unfabricable design 415 to generate the variations 435 and 445. Specifically, a "brush" comprising groups of two-by-two segments is rastered (i.e., traced) over the unfabricable design 415 in a scan pattern. In each position of that scan pattern, a decision is made to form two-by-two segments of either the first material (e.g., structural value of "0") or the second material (e.g., structural value of "1"). The decision of which structural value may be based on the underlying structural values of the unfabricable design 415. For example, if the "brush" traces over a group of segments containing more "1" than "0" structural values for the two-by-two segment, then that particular group of two-by-two segments will include all "1" structural values.

It is appreciated that using the above described paintbrush technique will result in variations that are considered "nearby" in the fabricable design space to the unfabricable design. However, in other embodiments a difference in structural parameters may be utilized to determine which of the variations is closest to the unfabricable design. For example, the variations 435 and 445 each differ from the unfabricable design 415 by the structural values of five segments and may be considered to be the same distance from the unfabricable design 415. However, if one of the variations have more different segments than the other, the variation with the least amount of different segments would be considered "closest" to the unfabricable design.

FIG. 5 is a block diagram illustrating a non-limiting example of a system 500 for implementing an optimization process for optimizing designs of a physical device by transitioning between fabricable and unfabricable designs, in accordance with an embodiment of the present disclosure.

As illustrated, system 500 includes computing device 505 coupled to display 507, input device 509, fabrication system 511, and remote resources 513. Computing device 505 includes one or more processors 515, local storage 517, network interface 519, memory 521, and computer-readable medium 523, each coupled to one another via communication bus 525. The memory 521 includes data stores for unfabricable designs 527, known fabricable design 529, proposed fabricable designs 531, and metadata 533. The computer-readable medium 523 includes optimization engine 535, perturbation engine 537, transformation engine 539, heuristic engine 541, simulation engine 543, and manufacturing model 545. It is appreciated that in some embodiments, computing device 505 may be a distributed system.

The computing device 505 is coupled to the display 507 (e.g., a light emitting diode display, a liquid crystal display, and the like) for displaying information to a user utilizing system 500 for the optimized process described in embodiments of the present disclosure. Input device 509 is coupled to computing device 505 for communicating information and command selections to the one or more processors 515. The input device 509 may include a mouse, trackball, keyboard, stylus, or other computer peripheral, to facilitate an interaction between the user and the computing device 505. In response, the computing device 505 may provide verification of the interaction through the display 507.

Another device, which may optionally be coupled to computing device 505, is the fabrication system 511, which may be utilized to manufacture the physical design (e.g., when the target fabricable design is generated). In some embodiments, computing device 505 includes network interface 519 which may couple the computing device 505 to remote resources 513. The remote resources 513 may be part of a distributed system and include any number of processors, memory, and other resources for the optimization process described in various embodiments of the present disclosure.

Computing device 505 may be considered as a controller or system that orchestrates operation of system 500 for optimizing designs of a physical device by transitioning between fabricable and unfabricable designs. The processor 515 (e.g., one or more central processing units, graphics processing units, and/or tensor processing units, etc.), the local storage 517 (e.g., magnetic memory such as computer disk drives), the memory 521 (e.g., volatile memory such as DRAM and SRAM, non-volatile memory such as ROM, flash memory, and the like), and the computer-readable medium 523 (e.g., instructions or logic implemented in hardware, software, or a combination) are coupled to each other through the communication bus 525. As used herein, the term "computer-readable medium" refers to a removable or nonremovable device that implements any technology capable of storing information in a volatile or non-volatile manner to be read by a processor (e.g., the processor 515) of a computing device (e.g., the computing device 505), including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

The computer-readable medium 523 includes software (e.g., instructions included in memory) and/or hardware logic (e.g., application specific integrated circuits, field-programmable gate arrays, and the like) that when executed by the one or more processor 515 causes the computing device 505 or the system 500 to perform operations. The operations may be based on instructions stored within any one of, or a combination of, the local storage 517, the memory 521, the computer-readable medium 523, or the remote resources 513 accessed via the network interface 519.

In accordance with embodiments of the present disclosure, the optimization engine 535 may configure the computing device 505 to perform the optimization process for optimization of a physical device by transitioning between fabricable and unfabricable designs (e.g., flowchart 200 of FIG. 2A). The perturbation engine 537 may configure the computing device 505 to perturb one or more of the known fabricable designs to generate one or more unfabricable designs that violate pre-determined design rules. The transformation engine 539 may configure the computing device 505 to transform the one or more unfabricable designs to proposed fabricable designs. The heuristic engine 541 may configure the computing device 505 to provide meta optimization. The simulation engine 543 and the manufacturing model 545 may be respectively configure the computing device 505 to determine performance metrics or fabrication metrics of the proposed fabricable designs.

As used herein, the term "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As used herein, the term "computer-readable medium" refers to a removable or nonremovable device that implements any technology capable of storing information in a volatile or non-volatile manner to be read by a processor of a computing device or system, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable storage medium having instructions stored thereon that, in response to execution by one or more processors of a computing system, cause the computing system to perform actions comprising:

receiving a pool of known fabricable designs for a physical device, each of the known fabricable designs capable of being fabricated by a fabrication system based on pre-determined design rules, wherein the known fabricable designs include segments collectively representative of the physical device, each segment included in the segments comprising a structural parameter describing the physical device;

generating proposed fabricable designs capable of being fabricated by the fabrication system based on the pre-determined design rules, wherein generating the proposed fabricable designs includes:

selecting at least one of the known fabricable designs from the pool;

perturbing the at least one of the known fabricable designs to generate one or more unfabricable designs that violate the pre-determined design rules, wherein the perturbing changes the structural parameter of one or more segments included in the segments for the at least one of the known fabricable designs to generate the one or more unfabricable designs; and transforming the one or more unfabricable designs to the proposed fabricable designs by modifying the one or more unfabricable designs to be compliant with the pre-determined design rules, wherein the proposed fabricable designs are different than the at least one of the known fabricable designs, and wherein the proposed fabricable designs are segmented designs;

obtaining metadata characterizing the proposed fabricable designs; and updating the pool of the known fabricable designs by adding one or more of the proposed fabricable designs to the pool based, at least in part, on the metadata, and wherein the physical device comprises an optical or electromagnetic device.

2. The non-transitory computer-readable storage medium of claim 1, wherein obtaining the metadata associated with the proposed fabricable design includes at least one of:

performing an operational simulation of the physical device with the proposed fabricable designs to determine a performance metric for each of the proposed fabricable designs, or evaluating the proposed fabricable designs based on a manufacturing model for the fabrication system to determine an expected yield, an expected robustness, or an expected variance of the proposed fabricable designs.

3. The non-transitory computer-readable storage medium of claim 2, wherein updating the pool of the known fabricable designs includes:

selecting, based on the performance metric for each of the proposed fabricable designs, at least a best performing one of the proposed fabricable designs to be added to the pool.

4. The non-transitory computer-readable medium of claim 2, wherein updating the pool of the known fabricable designs includes:

selecting, based on the performance metric for each of the proposed fabricable designs, at least a best N performing designs of the proposed fabricable designs to be added to the pool, wherein N is greater than 1.

5. The non-transitory computer-readable storage medium of claim 2, wherein the actions further comprise:

performing iterative cycles until the performance metric of at least one of the known fabricable designs meets a target performance metric, wherein each of the iterative cycles include receiving the pool of the known fabricable designs, generating the proposed fabricable designs, obtaining the metadata, and updating the pool based on the metadata.

6. The non-transitory computer-readable storage medium of claim 1, wherein the at least one of the known fabricable designs selected from the pool includes a first design and a second design, and wherein perturbing the at least one of the known fabricable designs includes:

combining a portion of the first design with a portion of the second design to generate an unfabricable design included in the one or more unfabricable designs.

7. The non-transitory computer-readable storage medium of claim 1, wherein each of the known fabricable designs and the proposed fabricable designs are two-dimensional designs or three-dimensional designs individually described by the segments that respectively correspond to pixels or voxels.

8. The non-transitory computer-readable storage medium of claim 7, wherein the pre-determined design rules restrict each of the known fabricable designs to include a first material and a second material, and wherein the structural parameter for each of the segments included in the known fabricable designs is representative of either the first material or the second material.

9. The non-transitory computer-readable storage medium of claim 8, wherein perturbing the at least one of the known fabricable designs includes:

shifting the structural parameter of one or more of the segments included in the at least one of the known fabricable designs to be representative of a blend of the first material and the second material to generate the one or more unfabricable designs.

10. The non-transitory computer-readable storage medium of claim 8, wherein the at least one of the known fabricable designs selected from the pool includes a first design and a second design, and wherein perturbing the at least one of the known fabricable designs includes:

performing a linear combination of the first design and the second design by averaging the structural parameter included in the segments for positionally common pairs of the segments included in the first design and the second design.

11. The computer-implemented method of claim 10, wherein updating the pool of the known fabricable designs includes:

selecting, based on the performance metric for each of the proposed fabricable designs, at least a best N performing designs of the proposed fabricable designs to be added to the pool, wherein N is greater than or equal to 1.

12. The non-transitory computer-readable storage medium of claim 8, wherein the at least one of the known fabricable designs selected from the pool includes a first design, a second design, and a third design, and wherein perturbing the at least one of the known fabricable designs includes:

averaging the structural parameter included in positionally common sets of the segments included in the first design, the second design, and the third design to generate a first unfabricable design included in the one or more unfabricable designs; and rounding the structural parameter averaged in the positionally common sets to be representative of either the first material or the second material when averaging the structural parameter results in a blend of the first material and the second material.

13. The non-transitory computer-readable storage medium of claim 8, wherein perturbing the at least one of the known fabricable designs includes:

selecting a first segment included in the segments of the at least one of the known fabricable designs; and flipping the structural parameter of the first segment to an opposite value to switch a structural value of the first segment between the first material and the second material.

14. The non-transitory computer-readable storage medium of claim 13, wherein the first segment is selected randomly from the at least one of the known fabricable designs.

15. The non-transitory computer-readable storage medium of claim 8, wherein perturbing the at least one of the known fabricable designs includes:

applying a local transformation or a global transformation to the at least one of the known fabricable designs to modify the structural parameter of the segments.

16. The non-transitory computer-readable storage medium of claim 1, wherein transforming the one or more unfabricable designs to the proposed fabricable designs includes:

identifying variations of the one or more unfabricable designs that are compliant with the pre-determined design rules; and determining a first variation included in the variations is closest to the one or more unfabricable designs, and wherein the first variation is included in the proposed fabricable designs.

17. The non-transitory computer-readable storage medium of claim 1, wherein the at least one of the known fabricable designs is selected randomly, randomly weighted by performance associated with known metadata for each of the known fabricable designs, as a best performing one determined from the known metadata, or from a top performing subset of the known fabricable designs determined from the known metadata.

18. A computer-implemented method, comprising:

receiving a pool of known fabricable designs for a physical device, each of the known fabricable designs capable of being fabricated by a fabrication system based on pre-determined design rules, wherein the known fabricable designs includes segments collectively representative of the physical device, each segment included in the segments comprising a structural parameter describing the physical device;

generating proposed fabricable designs capable of being fabricated by the fabrication system based on the pre-determined design rules, wherein generating the proposed fabricable designs includes:

selecting at least one of the known fabricable designs from the pool;

perturbing the at least one of the known fabricable designs to generate one or more unfabricable designs that violate the pre-determined design rules, wherein the perturbing changes the structural parameter of one or more segments included in the segments for the at least one of the known fabricable designs to generate the one or more unfabricable designs; and transforming the one or more unfabricable designs to the proposed fabricable designs by modifying the one or more unfabricable designs to be compliant with the pre-determined design rules, wherein the proposed fabricable designs are different than the at least one of the known fabricable designs, and wherein the proposed fabricable designs are segmented designs;

obtaining metadata characterizing the proposed fabricable designs; and updating the pool of the known fabricable designs by adding one or more of the proposed fabricable designs to the pool based, at least in part, on the metadata, and wherein the physical device comprises an optical or electromagnetic device.

19. The computer-implemented method of claim 18, wherein transforming the one or more unfabricable designs to the proposed fabricable designs includes:

identifying variations of the one or more unfabricable designs that are compliant with the pre-determined design rules; and determining a first variation included in the variations is closest to the one or more unfabricable designs, and wherein the first variation is included in the proposed fabricable designs.

20. The computer-implemented method of claim 18, wherein obtaining the metadata associated with the proposed fabricable design includes at least one of:

performing an operational simulation of the physical device with the proposed fabricable designs to determine a performance metric for each of the proposed fabricable designs, or evaluating the proposed fabricable designs based on a manufacturing model for the fabrication system to determine an expected yield, an expected robustness, or an expected variance of the proposed fabricable designs.

* * * * *